(12) United States Patent
Vaittinen et al.

(10) Patent No.: US 7,623,509 B2
(45) Date of Patent: Nov. 24, 2009

(54) ENHANCED HANDLING OF SYSTEM INFORMATION MESSAGES WHEN MOVING FROM DUAL TRANSFER MODE TO PACKET TRANSFER MODE

(75) Inventors: Rami Vaittinen, Littoinen (FI); Antti O. Kangas, Oulunsalo (FI)

(73) Assignee: Nokia Corporation, Espoo (FI)

( * ) Notice: Subject to any disclaimer, the term of this patent is extended or adjusted under 35 U.S.C. 154(b) by 365 days.

(21) Appl. No.: 10/867,574

(22) Filed: Jun. 14, 2004

(65) Prior Publication Data

US 2006/0007877 A1    Jan. 12, 2006

(51) Int. Cl.
*H04L 12/66* (2006.01)
*H04W 36/00* (2009.01)

(52) U.S. Cl. ...................... 370/352; 455/436
(58) Field of Classification Search .......... 370/352, 370/338; 455/426
See application file for complete search history.

(56) References Cited

U.S. PATENT DOCUMENTS

| | | | |
|---|---|---|---|
| 6,529,497 B1 | 3/2003 | Hjelm et al. | |
| 6,714,781 B2* | 3/2004 | Pecen et al. | 455/426.1 |
| 6,792,270 B1* | 9/2004 | Neumann | 455/432.1 |
| 6,940,834 B2* | 9/2005 | Bakke et al. | 370/331 |
| 6,961,570 B2* | 11/2005 | Kuo et al. | 455/436 |
| 7,106,706 B1* | 9/2006 | Chaturvedi et al. | 370/329 |
| 2002/0089956 A1 | 7/2002 | Haugli et al. | 370/335 |
| 2002/0111169 A1* | 8/2002 | Vanghi | 455/436 |
| 2002/0118662 A1* | 8/2002 | Sheynman et al. | 370/338 |
| 2003/0169725 A1 | 9/2003 | Ahmavaara et al. | 370/352 |

FOREIGN PATENT DOCUMENTS

| | | |
|---|---|---|
| WO | WO 00/69188 A1 | 11/2000 |
| WO | WO 01/20930 A1 | 3/2001 |

OTHER PUBLICATIONS

3GPP TS 44.060 v6.5.0 (Dec. 2003), "Radio Link Control/Medium Access Control (RLC/MAC) Protocol" (Release 6).

(Continued)

*Primary Examiner*—Patrick N Edouard
*Assistant Examiner*—Huy C Ho
(74) *Attorney, Agent, or Firm*—Ware, Fressola, Van Der Sluys & Adolphson LLP

(57) ABSTRACT

A method and terminal are disclosed for use in a wireless communication system, in order for the terminal to transition from a dual mode, in which a packet switched connection and circuit switched connection are used, to a single mode in which packets are transferred. The mobile terminal is for receiving minimum system information necessary to perform this transition in an uninterrupted manner. This system information is sent to the mobile terminal automatically or on a regular basis, and is additionally sent to the mobile terminal partly upon request of the mobile terminal. A release indication is sent to the terminal separately from the system information, notifying the terminal that the circuit switched connection will be released, at which point a timer is started. The system information is employed by the mobile terminal to transition from the dual mode in the uninterrupted manner, if the timer has not expired.

28 Claims, 5 Drawing Sheets

OTHER PUBLICATIONS

3GPP TS 45.008 v6.5.0 (Nov. 2003), "Radio Access Network; Radio Subsystem Link Control" (Release 6).
3GPP TS 44.018 v6.5.0 (Dec. 2003), "Mobile Radio Interface Layer 3 Specification; Radio Resource Control (RRC) Protocol" (Release 6).
3GPP TS 43.064 v6.1.0 (Aug. 2003), Overall Description of the GPRS Radio Interface; Stage 2: (Release 6).
3GPP TS 23.060 v6.3.0 (Dec. 2003), "General Packet Radio Service (GPRS); Service Description; Stage 2" (Release 6).
3GPP TS Tdoc GP-041144 (Apr. 2004), "Introduction of Non-Segmented Provision of Serving Cell System Information Messages on PACCH".
3GPP TS TDoc G2-040288 (Mar. 2004), "Enhancement of Dual Transfer Mode When Circuit Switched Resources are Released".

* cited by examiner

ENHANCED HANDLING OF SYSTEM INFORMATION MESSAGES WHEN MOVING FROM DUAL TRANSFER MODE TO PACKET TRANSFER MODE

RELATED APPLICATIONS

The present application is related to copending U.S. application Ser. No. 10/802,407 and copending U.S. application Ser. No. 10/763,936. The latter copending U.S. application Ser. No. 10/763,936 is incorporated herein by reference, and is titled "Enhancement of Dual Transfer Mode When Circuit Switched Resources Are Released."

FIELD OF THE INVENTION

The present invention relates to wireless communication, and more particularly to packet switching and circuit switching for wirelessly communicating with a mobile terminal.

BACKGROUND OF THE INVENTION

The first Global System for Mobile (GSM) communication networks were designed for voice services rather than for data services. When the use of GSM data services started, it soon became evident that the Circuit Switched (CS) bearer services were not well-suited for certain types of applications with a bursty nature. Therefore the new Packet Switched (PS) data transmission service GPRS (General Packet Radio Service) was developed for packet services. GPRS is a packet radio network utilizing the GSM network, and GPRS endeavours to optimize data packet transmission by means of GPRS protocol layers on the air interface between a mobile station (hereinafter also called a mobile terminal) and a GPRS network.

A GPRS mobile station (MS), also called a mobile terminal, can operate in one of three modes of operation, as described in 3GPP TS 23.060, "Service description; Stage 2," Section 5.4.5. The three modes are Class-A Mode, Class-B Mode, and Class-C Mode. According to the Class-A mode of operation, the MS is attached to both GPRS as well as other GSM services, and therefore Class-A Mode corresponds to Dual Transfer Mode (DTM) (hereinafter also called dual mode). The mobile user in Class-A Mode can make and/or receive calls on the two services simultaneously, for example having a normal GSM voice call and receiving GPRS data packets at the same time. According to the Class B mode of operation, the MS is attached to both GPRS and other GSM services, but the MS can only operate one set of services at a time. According to the Class C mode of operation, the MS can only be attached either to the GSM network or the GPRS network; the selection is done manually and there are no simultaneous operations.

Based on the current standard (3GPP TS 44.018, "Radio Resource Control Protocol"), when the MS releases a CS connection (also referred to as a radio resource or RR connection) while in the Dual Transfer Mode (DTM), all packet resources are aborted. This is illustrated in FIG. 1 (also see 3GPP TS 43.064, "Overall description of the GPRS radio interface; Stage 2"), which shows RR operating modes and transitions between Class-A (DTM supported) and Class-B. An RR Release moves the MS from the Dual Transfer Mode 102 into an Idle/Packet Idle state 104, after which the MS must then obtain packet access in order to perform packet transfer. In other words, after the release of the CS connection, the MS is in the packet idle mode and must perform a complete acquisition of system information and ask for PS resources again, in order to get into the Packet Transfer Mode 106.

FIG. 2 further illustrates how the system is currently working, according to the prior art. The four vertical lines represent portions or stages of the network. The line 202 represents the mobile station (MS), the line 204 represents the base station system (BSS), the line 206 represents the serving GPRS support node (SGSN), and the line 208 represents the mobile switching center (MSC). FIG. 2 shows that initially a packet switched session 210 and a circuit switched session 212 are in progress according to the dual mode. Then, either the MS or the network can initiate a disconnect of the CS connection, which causes the circuit switched call to be released at call control level and subsequently the channel is released.

In FIG. 2, the difference between the "release" and the subsequent "channel release" is as follows. The "RELEASE" message is a GSM Call Control protocol message, which merely releases the circuit-switched call at the Call Control level. Note that this message exchange (RELEASE, RELEASE COMPLETE) does not occur with all dedicated connections, such as Short Message Service (SMS) or MM Location Update. Regarding the 'CHANNEL RELEASE' message in FIG. 2, that is a GSM Radio Resource protocol message which indicates that the Radio Resource (i.e. channel) is being released, after which the MS returns to (packet) idle mode according to FIG. 2. Thus, the two 'release' messages belong to different protocol entities. In FIG. 2, the MS initiates the disconnect of the CS connection, and the MS then transfers to the packet idle state 214 from which the MS must perform a complete acquisition of system information in order to get back into a packet switched session 216.

If the network supports a Packet Broadcast Control Channel (PBCCH), then the MS will not perform packet access or enter the packet transfer mode 216 until it has acquired the PACKET SYSTEM INFORMATION TYPE 1 (PSI1) message, and acquired a consistent set of PSI2 messages, and also made at least one attempt to receive the complete set of PSI messages on PBCCH. See 3GPP TS 44.060, "Radio Link Control/Medium Access Control (RLC/MAC) protocol" and 3GPP TS 45.008, "Radio Subsystem Link Control." If the network supports the PACKET PSI STATUS message, the mobile station may perform packet access, and enter packet transfer mode 216, as soon as the PSI1 message and a consistent set of PSI2 messages have been received.

On the other hand, if the PBCCH is not present in the network, then the MS must perform a complete acquisition of Broadcast Control Channel (BCCH) messages, in which case the mobile station will not perform packet access or enter the packet transfer mode 216 until it has acquired the SYSTEM INFORMATION TYPE 3 (SI3), SI13 and, if present, SI1 messages, and additionally has made at least one attempt to receive other SI messages that may be scheduled within one TC cycle on BCCH. TC is a formed mathematical expression of a GSM "multiframe modulo." The TC value is cyclic and runs from values 0 to 7 (i.e. the TC can have values TC=0, TC=1, TC=2, . . . TC7). One GSM multiframe (on BCCH/CCCH) consists of 51 TDMA frames, adding up to 51 times 60/13 ms which equals approximately 235 ms. Therefore, 8 multiframes (i.e. TC0 . . . TC7) adds up to approximately 1.8 seconds. The reason for quoting the TC value in the context of the present invention is to establish the significant delay experienced from the SYSTEM INFORMATION RECEPTION on the BCCH, in case the CS connection needs to be released before packet access is again possible for the MS (as is specified now according to the prior art).

If the network supports the PACKET SI STATUS message, the MS may perform packet access, and enter packet transfer mode, as soon as the SI3, SI13 and, if present, SI1 messages have been received.

The main problem with these prior art techniques is that the MS is not allowed to immediately enter the packet transfer mode 216 until it has performed various steps. Thus, the mobile station will be forced to idle its packet switching capabilities, while it sets up the packet switching session 216. The related U.S. application "Enhancement of Dual Transfer Mode When Circuit Switched Resources Are Released" addresses this problem, and the present invention also addresses this problem (this related U.S. application is similar to 3GPP Tdoc G2-040288). The present invention covers some issues that this related U.S. application did not address: first, the indication of system information delivery on the packet associated control channel (PACCH), and second, system information handling in the MS, based upon validity time. A possible problem with the solution of the application "Enhancement of Dual Transfer Mode When Circuit Switched Resources Are Released" is that it is possible for a gap to occur in the PS session after the CS connection release, and the present invention solves this possible problem. For further background regarding system information messages, see 3GPP TS Tdoc GP-041144, "Introduction of non-segmented provision of serving cell SYSTEM INFORMATION messages on PACCH."

SUMMARY OF THE INVENTION

The present invention is an improvement of the invention in the copending U.S. application titled "Enhancement of Dual Transfer Mode When Circuit Switched Resources Are Released" which is incorporated herein by reference. The present invention enhances the MS behaviour in the Class-A mode of operation, in order to expedite a transition to Class-B mode.

One way to accelerate the radio resource (RR) mode transition from the dual transfer mode (Class-A) to a packet transfer mode (Class-B) is to offer the minimum system information to continue packet transfer already occurring in the dual transfer mode, and then offering the rest of the system information after the transfer from dual mode to packet mode. Accordingly, the present invention includes a method, mobile terminal, and system for use in a wireless communication system, in order for the mobile terminal to be able to transition from a dual transfer mode, in which a packet switched connection and circuit switched connection are used together, to a packet transfer mode in which packets are transferred.

A method and mobile terminal are disclosed here for use in a wireless communication system in order for the mobile terminal to be able to transition from the dual mode, in which a packet switched connection and circuit switched connection are used together, to a single mode in which packets are transferred. The mobile terminal is for receiving minimum system information necessary to perform the transition in an uninterrupted manner, instead of an interrupted manner. This system information is sent to the mobile terminal automatically or on a regular basis, and is also sent to the mobile terminal partly or entirely by upon request. A release indication is sent via a packet associated control channel (PACCH) to the mobile terminal, notifying the mobile terminal that the circuit switched connection will be released, and this starts a timer. The system information is then employed by the mobile terminal to transition from the dual mode to the single mode in the uninterrupted manner, if the timer has not expired. Especially if the mobile terminal is not moving rapidly from one service area to another, it will also be advantageous for the mobile terminal to try maintaining a valid set (or at least part or percentage of a valid set) of the minimum system information, even if the indication has not yet been received.

This invention has the advantage that the MS can maintain PS resources and gain better quality of service for a packet application. Gaps in PS service are minimized, especially if the MS has not changed location area during the CS connection. This invention thus allows an RR operation mode to be changed directly from dual transfer mode to the packet transfer mode without the release of packet resources after the release of the RR connection.

DETAILED DESCRIPTION OF THE INVENTION

The present invention describes a way to enhance the transition between two main situations: dual transfer mode, and packet transfer mode. Regarding action while in dual transfer mode, as mentioned previously, the MS obtains a certain set of system information depending on whether a packet control channel is supported or not by the network, in order to continue without a service gap in the packet transfer mode after an RR connection is released.

Figure 1:
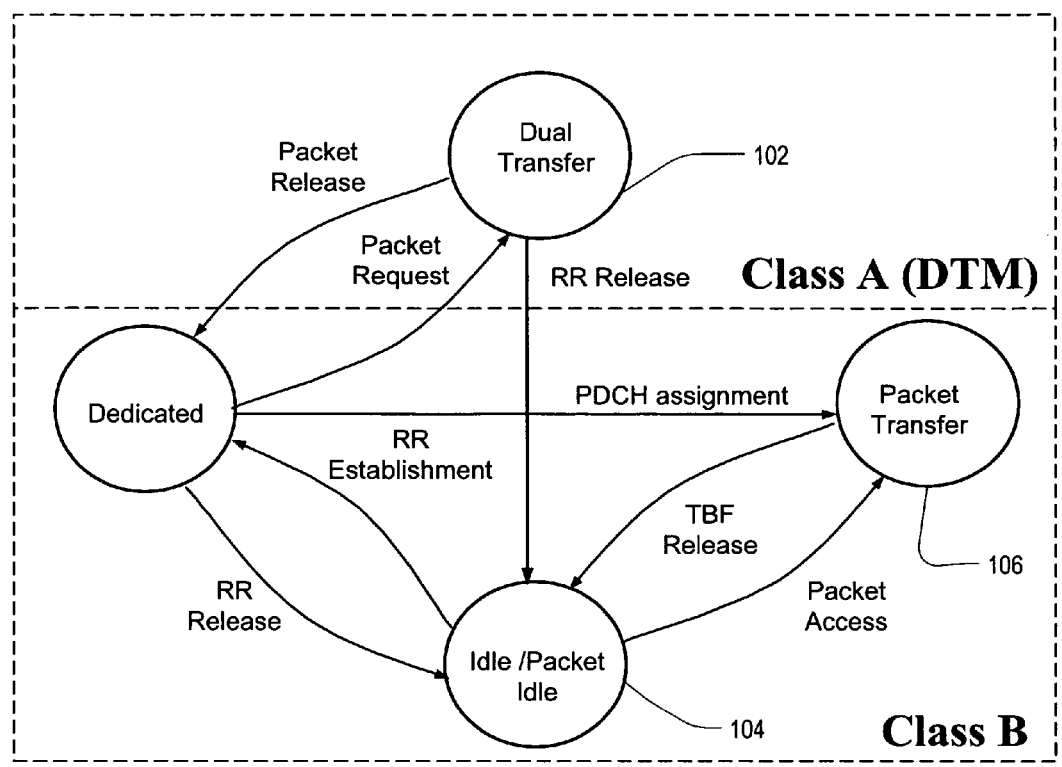
FIG. 1 shows how a mobile terminal transitions from dual transfer mode according to the prior art.
Figure 2:
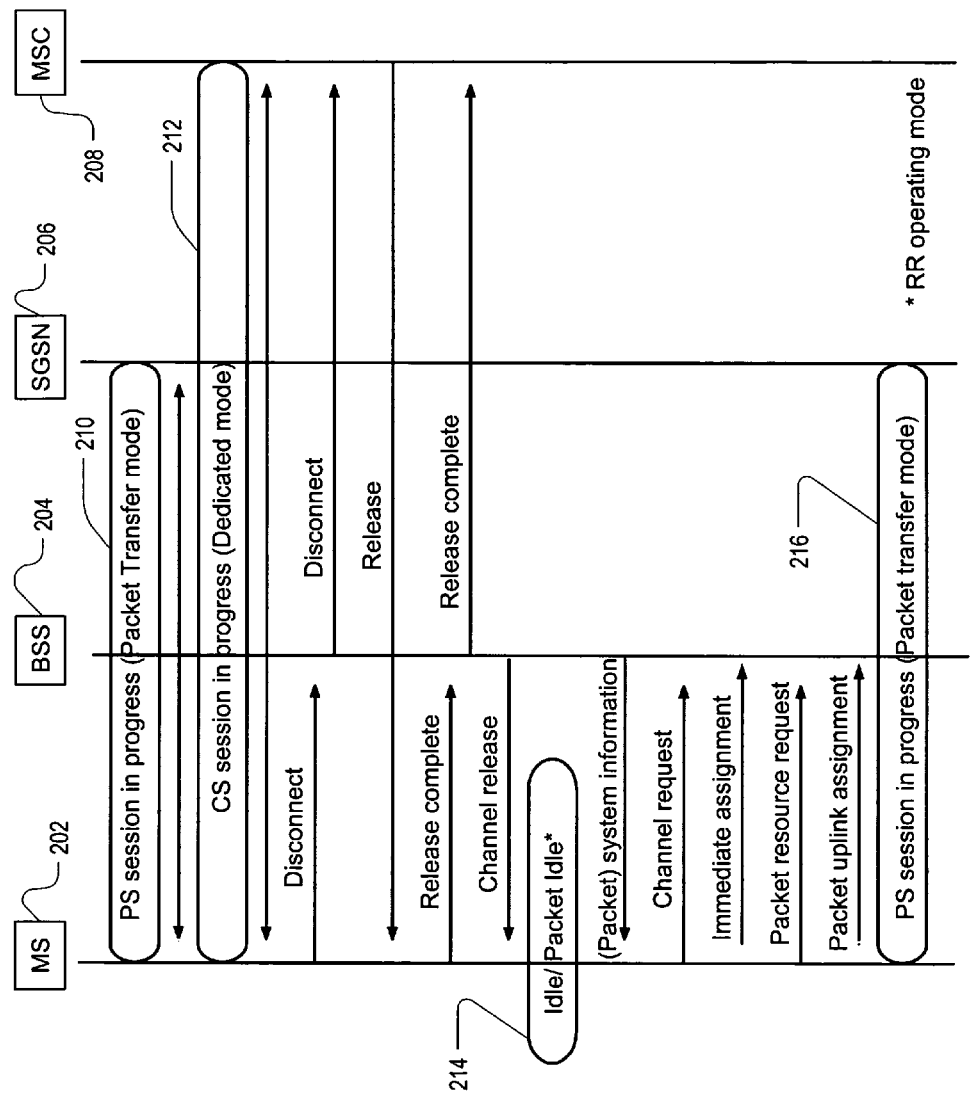
FIG. 2 details the transition from dual mode to packet mode according to the prior art.
Figure 3:
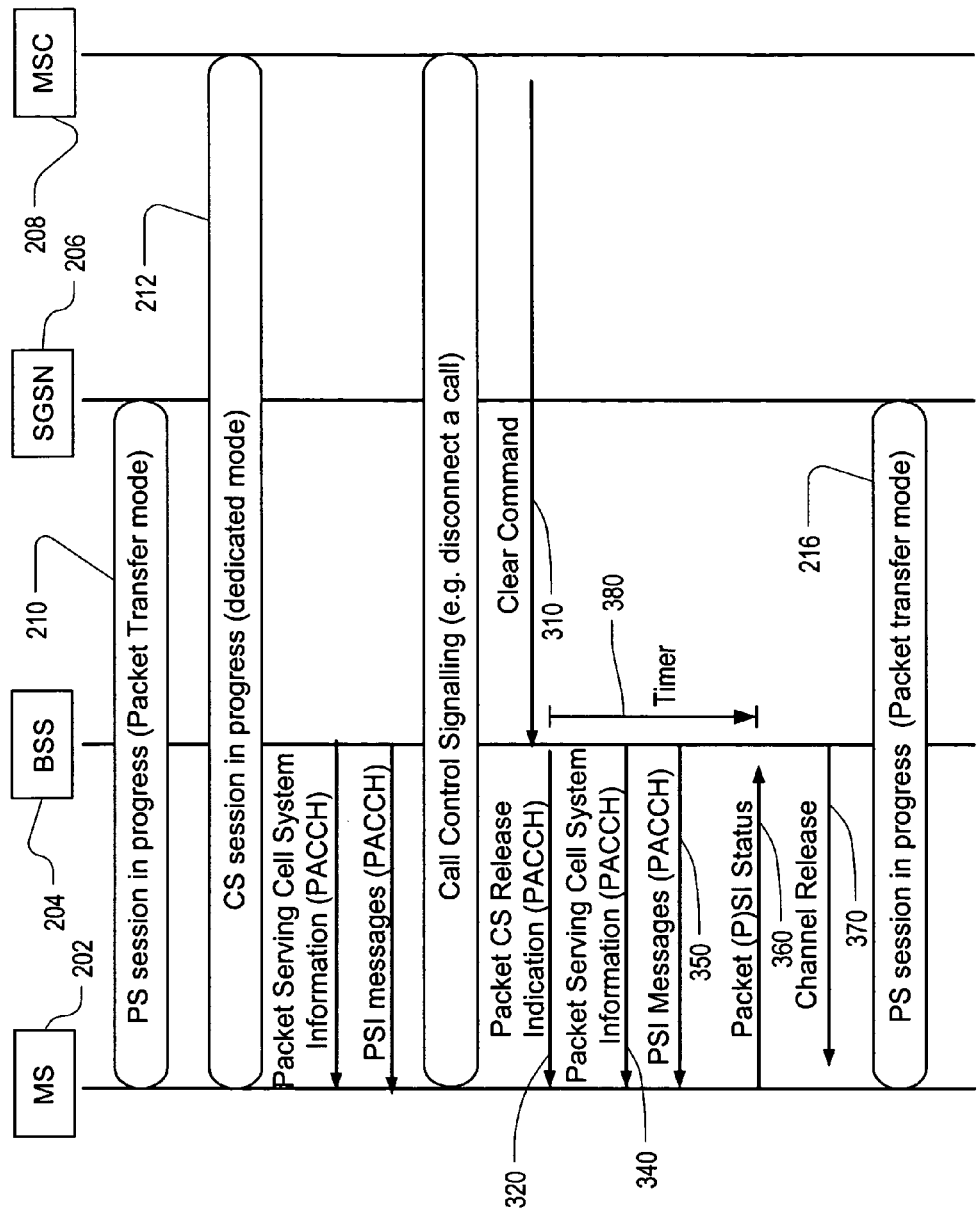
FIG. 3 details the transition from dual transfer mode to packet transfer mode according to the present invention.

FIG. 3 depicts the enhanced transition from dual mode, due to an RR connection release. It is assumed in this embodiment that a packet control channel is supported. The RR connection 212 release is initiated by the MSC 208 that sends the CLEAR COMMAND 310 message to the BSS 204. The BSS indicates the start of this procedure by sending a new message, for example a PACKET CS RELEASE INDICATION 320 on the PACCH (or on the main dedicated control channel so that the message can be an RR level message). To make sure that the mobile station 202 has received this message, the network may poll it or send the message several times. Adding this indication (that the release procedure is starting) in RLC/MAC messages can also accomplish this indicating task. In case of PSI messages 350, the addition of the indication is possible because those messages have free space. However, a problem may exist with using SI messages 340. The SI messages are encapsulated in the PACKET SERVING CELL SI message 340 (sent via PACCH) that may be totally full, and therefore the addition of new information would be impossible. The indication would be added to every (P)SI message 350 (i.e. in the required set) and therefore that solution for alerting the MS 202 about the release cannot be seen as favorable as compared to using a single new message 320.

The PACKET CS RELEASE INDICATION 320 has the following structure in this embodiment:

```
<Packet CS Release Indication>::=
    {0, GLOBAL_TFI : Global TFI IE > >
    | 1 < TLLI : < TLLI IE > > }
    < PACKET CS_RELEASE INDICATION : bit (1) >
    < padding bits > ;
```

Immediately after sending the above-described indication message 320, the network sends a corresponding set of (P)SI messages 350. In further contrast to what is described in the copending application titled "Enhancement of Dual Transfer Mode When Circuit Switched Resources Are Released," a PACKET SERVING CELL DATA message from the network is not used here. The network can send PSI messages 350 on the PACCH, and SI messages may be encapsulated in the PACKET SERVING CELL SI message 340.

If packet control channels are supported, then the network may send PSI1 and a consistent set of PSI2 messages when the MS is in the dual transfer mode. However, if packet control channels are not supported, then the network may send SI3, SI13 and, if present, SI1 messages when the MS is in the dual transfer mode.

The network will send the needed system information before the release of an RR connection. The CHANNEL RELEASE message 370 is sent after the MS 202 acknowledges that it has received correctly all needed system information. The PACKET (P)SI STATUS message 360 can be used to acknowledge the receipt of system information, as discussed in the copending application titled "Enhancement of Dual Transfer Mode When Circuit Switched Resources Are Released."

If a network cannot send all needed information, or if it has insufficient resources, then the network can just send a CHANNEL RELEASE message with a notification that the MS is not allowed to continue in the packet transfer mode immediately after the release of the RR channel. In this case, after the release of the PS resources, the MS may ask for them again, as already specified in the prior art. Alternatively, the network will preferably indicate that the MS is allowed to continue in the packet transfer mode after the release of CS resources.

A timer 380 is defined in the network for awaiting a response from the MS to the receipt of system information messages. The network starts the timer when the indication is sent to the MS 202, and it is stopped when the network receives the PACKET (P)SI STATUS message 360 acknowledging that the required set of (P)SI messages have been received by the MS, as shown in FIG. 3. In case no response is received by the network (i.e. the timer expires), the network will send a CHANNEL RELEASE message 370 with an indication that the MS is not allowed to continue in the packet transfer mode after release of an RR connection. The value of the timer 380 shall be set so that the network resources are not wasted too long; for example, when the MS has only DL TBF allocated, it shall wait until it is polled to send a PACKET DOWNLINK ACK/NACK message.

Another option in handling of system information while in DTM is for the MS to attempt to maintain the above-described sets of system information at all times. While in DTM, the MS may receive PSI or SI messages on the PACCH. On the PACCH, PSI messages can be sent, since they are RLC/MAC messages, but SI messages are encapsulated in the PACKET SERVING CELL SI message.

In 3GPP TS 44.060, "Radio Link Control/Medium Access Control (RLC/MAC) protocol," it is specified that the MS shall check every 30 seconds whether the system information has been changed. This can also be a reasonable way for the MS to check for PSI messages received on the PACCH when in dual transfer mode. This means that the MS cannot use PSI messages received more than 30 seconds ago. Note that the MS may disregard (P)SI messages sent on the PACCH.

If the MS is missing some system information message(s), or if messages are too old, the MS may request them by using the PACKET (P)SI STATUS message. In a static case (i.e. the MS remains in the same call), it would be enough to simply check PSI1 when the PBCCH exists on the cell, and otherwise then check PSI14 or PSI13. PSI1 includes a PBCCH_CHANGE_MARK field in which is indicated whether some packet system information messages have been changed. Correspondingly, PSI14 and PSI13 include a BCCH_CHANGE_MARK indication for system information messages. If the (P)BCCH_CHANGE_MARK field does not indicate the change, then the current set is still valid. If some message(s) have been changed, then the MS shall request them by using the PACKET (P)SI STATUS message.

In a mobility scenario, for example after handover, the MS will request the required set of target cell system information. If the MS moves and is handed over frequently, many set updates are required. Therefore, system information handling based on validity time (i.e. maintaining a valid basic set all the time) would have less merit than the previous option described above.

A further option in the CS connection release would be to send system information messages on the dedicated resource as acknowledged messages on the main DCCH, or as unacknowledged messages on the SACCH main DCCH. When using main DCCH (SDCCH/FACCH), the system information messages are sent in a point-to-point manner or upon request of the mobile terminal, and the MS can acknowledge them. However, the MS cannot acknowledge system information messages when using UI-frames (SACCH/FACCH). The structure of the message sent via the main DCCH or using UI-frames is shown in the following table:

| IEI | Information Element | Type/Reference | Presence | Format | Length |
| --- | --- | --- | --- | --- | --- |
| | GTTP Protocol Discriminator | Protocol Discriminator 10.2 | M | V | ½ |
| | Skip Indicator | Skip Indicator 10.3.1 | M | V | ½ |
| | System Information Message Type | Message Type 10.4 | M | V | ½ |
| | System Information PDU | System Information PDU Container | M | V | 20-n |

Note that the system information PDU in this table contains an information element describing whether the message includes a BCCH (RR) or PBCCH (RLC/MAC) PDU.

Figure 4:
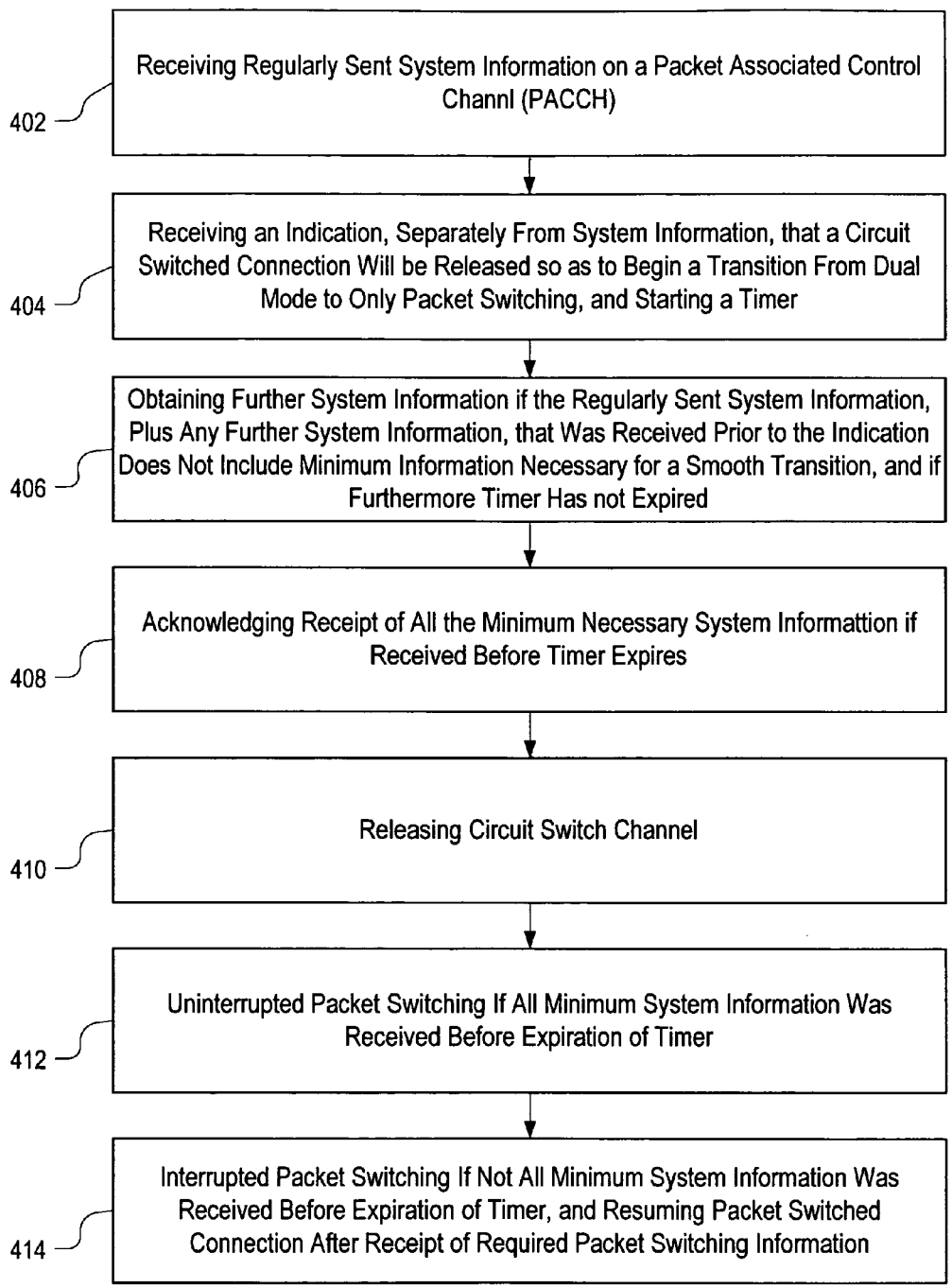
FIG. 4 is a flow chart of a method according to an embodiment of the present invention.

Referring now to the flowchart of FIG. 4, this illustrates a method according to embodiment of the present invention. This method is for a mobile terminal to transition from a dual transfer mode, in which a packet switched connection and circuit switched connection are used together, to a packet transfer mode in which packets are transferred. In the step 402, at least a portion of minimum system information is received that is necessary to perform the transition in an uninterrupted manner. In this step 402, the information is sent on a regular basis or automatically (i.e. not in response to particular requests from the mobile terminal) to the mobile terminal. In step 404, the mobile terminal receives an indication, sent separately from any of the system information, that a circuit switched connection will be released so as to transition the mobile terminal from dual mode to only packet switching mode, and this step additionally includes starting a timer. Then, further system information is obtained 406 (if such further information is still needed) via point-to-point communication or upon request, instead of on a regular or automatic basis, provided that the timer has not yet expired. Receipt of all necessary further information is acknowledged 408, and then the circuit switching channel is released 410. If all the needed system information was obtained before expiration of the timer, then an uninterrupted transition from dual mode occurs 412, but otherwise the transition will be interrupted 414. As indicated in step 406, valid system information can be obtained via communication upon request even prior to the indication 404, and this validity time period may be particular useful in situation where the mobile terminal is not rapidly moving from one cell to another.

Figure 5:
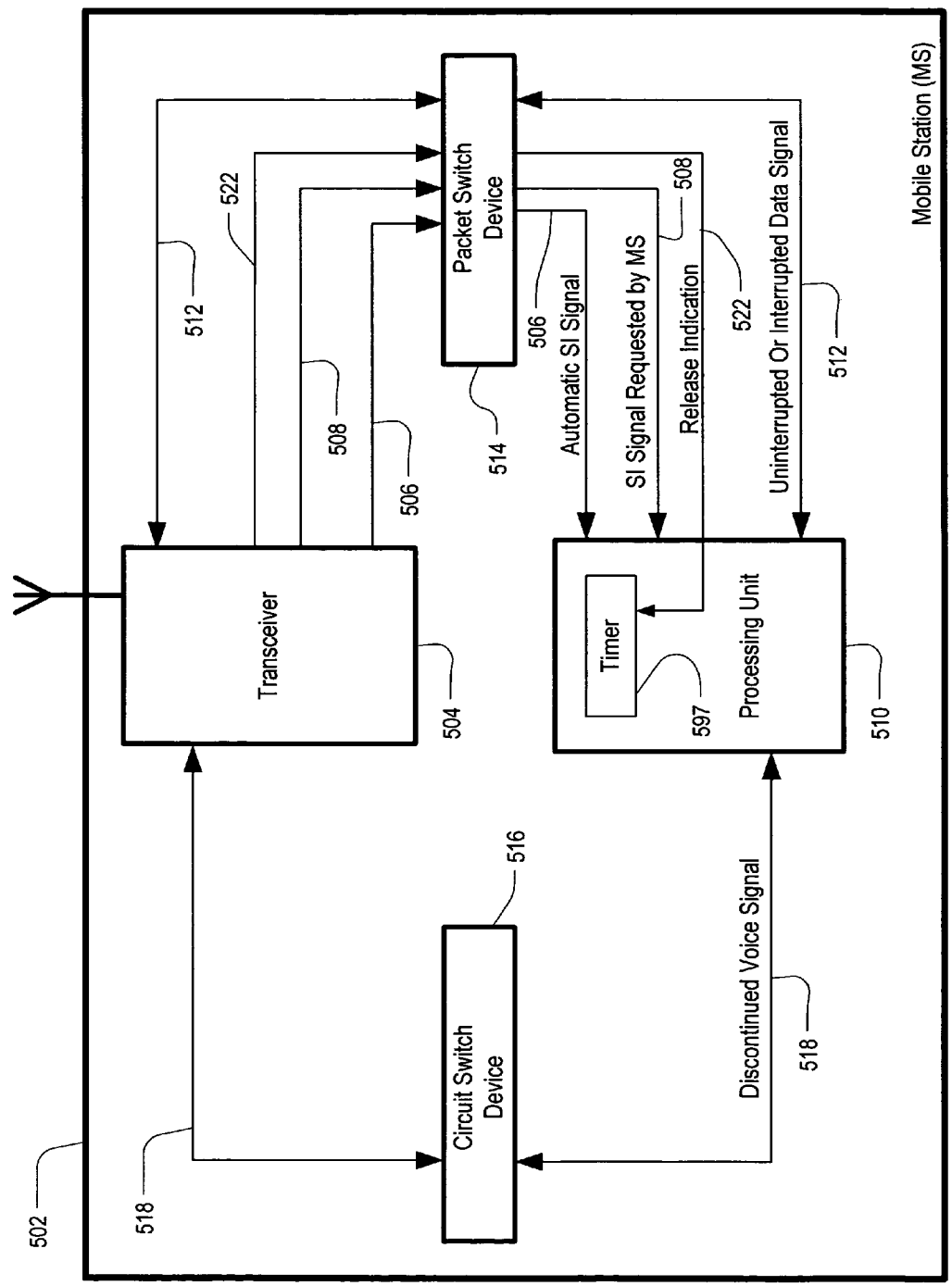
FIG. 5 is a block diagram of a mobile terminal according to the present invention.

Referring now to FIG. 5, this shows a mobile terminal 502 according to an embodiment of the present invention, for transitioning in a wireless communication system from a dual mode wherein a packet switched connection and circuit switched connection are used together, to a single mode wherein packets are transferred. This mobile terminal includes a transceiver 504, for sending toward a processing unit 510 at least one automatic system information signal 506 and at least one further system information signal 508 requested by the MS, in order to provide the processing unit 510 at least minimum information necessary to perform the transition in an uninterrupted manner. The processing unit 510 is responsive to the minimum system information, and is for employing that information to transition the mobile terminal from the dual mode to the single mode in the uninterrupted manner. The processing unit 510 is also responsive to the release indication signal 522 that starts a timer 597. The transition is uninterrupted only if the timer has not expired by the time the transition from dual mode occurs, and if it has expired then the transition will be temporarily interrupted as in the prior art. Of course, the timer can alternatively be located at the network side. The mobile terminal 502 further includes a packet switch device 514, for processing and passing the data signal 512 between the processing unit 510 and the transceiver 504. The mobile terminal further includes a circuit switch device 516, for processing and passing a voice or other non-bursty signal 518 between the processing unit 510 and the transceiver 504, the voice signal 518 being discontinued whereas the data signal 512 is uninterrupted or temporarily interrupted. Thus, this mobile terminal shown in FIG. 5 is capable of performing the method illustrated in FIG. 4.

It is to be understood that all of the present figures, and the accompanying narrative discussions of best mode embodiments, do not purport to be completely rigorous treatments of the method, terminal, and system under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software which need not be further detailed herein, without departing from the spirit and scope of the present invention.

What is claimed is:

1. A method comprising:
    operating in a dual transfer mode, in which a packet switched connection and circuit switched connection are used together simultaneously for sending and receiving information on each of said connections,
    receiving a release indication, in order to notify that the circuit switched connection will be released,
    receiving system information necessary to perform an uninterrupted transition from the dual transfer mode to a single mode in which packets are transferred,
    receiving a channel release message indicating whether the received system information is sufficient to perform the transition in an uninterrupted manner, and
    employing the system information to transition from the dual transfer mode to the single mode in the uninterrupted manner if the channel release message says that the received system information is sufficient, and otherwise transitioning from the dual transfer mode to the single mode in an interrupted manner.

2. The method of claim 1, wherein the release indication is sent separately from the system information.

3. The method of claim 1, wherein at least part of the system information received upon request is for maintaining a valid set, or portion, of the minimum system information during a period of time before the channel is released.

4. The method of claim 1, wherein the dual transfer mode corresponds to a Class-A mode, and the single mode corresponds to a Class-B or Class-C mode.

5. The method of claim 4, wherein the system information includes a packet system information message.

6. The method of claim 5, wherein the packet system information message is received before a channel for the circuit switched connection is released.

7. The method of claim 1, further comprising sending an acknowledgment that all of the system information was obtained, and wherein the channel is released after the system information is obtained.

8. The method of claim 7, wherein a packet SI status, or packet PSI status, comprises the acknowledgment.

9. The method of claim 1, wherein at least part of the system information is received via a dedicated resource as at least one acknowledged or unacknowledged message.

10. The method of claim 1, wherein the release indication is received via a packet associated control channel or a dedicated control channel.

11. An apparatus comprising:
    a transceiver configured to receive at least one system information signal, that provides the apparatus system information necessary to perform a transition in an uninterrupted manner from a dual transfer mode, wherein a packet switched connection and circuit switched connection are used together to send and receive information on each of said connections, to a single mode wherein packets are transferred; and
    a processing unit configured to employ the system information to transition from the dual transfer mode to the single mode in the uninterrupted manner if and only if the apparatus receives a channel release message saying to perform the transition in the uninterrupted manner, otherwise transitioning from the dual transfer mode to the single mode in an interrupted manner, wherein said processing unit being responsive to the system information from the transceiver.

12. The apparatus of claim 11, further comprising:
a packet switch device, configured to process and pass an uninterrupted or temporarily interrupted data signal between the processing unit and the transceiver; and
a circuit switch device, configured to process and pass a voice signal between the processing unit and the transceiver, the voice signal being discontinued whereas the data signal is uninterrupted or temporarily interrupted.

13. The apparatus of claim 11, wherein the dual transfer mode corresponds to a Class-A mode, and the single mode corresponds to a Class-B or Class-C mode.

14. The apparatus of claim 11, wherein the release indication signal is received separately from the system information.

15. The apparatus of claim 11, wherein the transceiver is also configured to receive the at least part of the system information, sent via a dedicated resource, as at least one acknowledged or unacknowledged message.

16. The apparatus of claim 11, wherein the transceiver is also configured to receive the release indication that is sent via a packet associated control channel or a dedicated control channel.

17. The apparatus of claim 11, wherein the transceiver is further configured to send an acknowledgement that all of the system information was obtained, and wherein the channel is released after the system information is obtained.

18. A system comprising:
a base station configured to provide at least one system information signal, in order to provide the mobile terminal system information necessary to perform a transition in an uninterrupted manner from a dual transfer mode, wherein a packet switched connection and circuit switched connection are used together to send and receive information on each of said connections, to a single mode wherein packets are transferred; and
a mobile terminal, responsive to the system information, and configured to employ the system information to transition from the dual transfer mode to the single mode in the uninterrupted manner, if and only if the apparatus receives a channel release message saying to perform the transition in the uninterrupted manner, otherwise transitioning from the dual transfer mode to the single mode in an interrupted manner;
wherein the channel release message says that the received system information is insufficient to perform the transition in the uninterrupted manner, if and only if a certain amount of time has expired from a release indication without the mobile terminal reporting receipt of sufficient system information to perform the transition in the uninterrupted manner.

19. An apparatus comprising:
a first element, configured to provide to a mobile terminal at least minimum system information necessary to perform a transition in an uninterrupted manner from a dual transfer mode, wherein a packet switched connection and circuit switched connection are used together to send and receive information on each of said connections, to a single mode wherein packets are transferred;
a second element, configured to provide a release indication signal which starts a timer; and
a third element, configured to provide a channel release message to transition the mobile terminal from the dual transfer mode to the single mode in the uninterrupted manner only if the apparatus is informed that the mobile terminal has received said minimum system information before the timer has expired, otherwise transitioning from the dual transfer mode to the single mode in an interrupted manner.

20. The apparatus of claim 19, wherein at least part of the system information is sent via a dedicated resource as at least one acknowledged or unacknowledged message.

21. The apparatus of claim 19, wherein said system information is sent by the apparatus upon request, or without request, or both.

22. An apparatus, comprising:
means for providing to a mobile terminal at least minimum system information necessary to perform a transition in an uninterrupted manner from a dual transfer mode, wherein a packet switched connection and circuit switched connection are used together to send and receive information on each of said connections, to a single mode wherein packets are transferred;
means for providing a release indication signal which starts a timer; and
means for providing a channel release message to transition the mobile terminal from the dual transfer mode to the single mode in the uninterrupted manner only if the apparatus is informed that the mobile terminal has received said minimum system information before the timer has expired, otherwise transitioning from the dual transfer mode to the single mode in an interrupted manner.

23. An apparatus comprising:
means for operating in a dual transfer mode, in which a packet switched connection and circuit switched connection are used together simultaneously for sending and receiving information on each of said connections,
means for receiving a release indication, in order to notify that the circuit switched connection will be released,
means for receiving system information necessary to perform an uninterrupted transition from the dual transfer mode to a single mode in which packets are transferred,
means for receiving a channel release message indicating whether the received system information is sufficient to perform the transition in an uninterrupted manner, and
means for employing the system information to transition from the dual transfer mode to the single mode in the uninterrupted manner if the channel release message says that the received system information is sufficient, otherwise transitioning from the dual transfer mode to the single mode in an interrupted manner.

24. The apparatus of claim 23, wherein said system information is received by the apparatus upon request, or without request, or both.

25. A computer readable medium encoded with a software data structure sufficient for:
operating in a dual transfer mode, in which a packet switched connection and circuit switched connection are used together simultaneously for sending and receiving information on each of said connections,
receiving a release indication, in order to notify that the circuit switched connection will be released,
receiving system information necessary to perform an uninterrupted transition from the dual transfer mode to a single mode in which packets are transferred,
receiving a channel release message indicating whether the received system information is sufficient to perform the transition in an uninterrupted manner, and employing the system information to transition from the dual transfer mode to the single mode in the uninterrupted manner if the channel release message says that the received system information is sufficient, otherwise transitioning from the dual transfer mode to the single mode in an interrupted manner.

26. The computer readable medium of claim 25, wherein said system information is received upon request, or without request, or both.

27. A method, comprising:

providing to a mobile terminal at least minimum system information necessary to perform a transition in an uninterrupted manner from a dual transfer mode, wherein a packet switched connection and circuit switched connection are used together to send and receive information on each of said connections, to a single mode wherein packets are transferred;

providing a release indication signal which starts a timer; and providing a channel release message to transition the mobile terminal from the dual transfer mode to the single mode in the uninterrupted manner only if being informed that the mobile terminal has received said minimum system information before the timer has expired, otherwise transitioning from the dual transfer mode to the single mode in an interrupted manner.

28. The method of claim 27, wherein at least part of the system information is sent via a dedicated resource as at least one acknowledged or unacknowledged message.

\* \* \* \* \*

UNITED STATES PATENT AND TRADEMARK OFFICE
CERTIFICATE OF CORRECTION

PATENT NO. : 7,623,509 B2 Page 1 of 1
APPLICATION NO. : 10/867574
DATED : November 24, 2009
INVENTOR(S) : Vaittinen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 762 days.

Signed and Sealed this

Twenty-sixth Day of October, 2010

David J. Kappos
*Director of the United States Patent and Trademark Office*